(12) United States Patent
Noro et al.

(10) Patent No.: US 6,226,580 B1
(45) Date of Patent: May 1, 2001

(54) ELECTRIC POWER STEERING APPARATUS

(75) Inventors: Yoshiki Noro; Shinzi Hironaka; Yoshinobu Mukai; Mitsunori Kawashima, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/429,276

(22) Filed: Oct. 29, 1999

(30) Foreign Application Priority Data

Dec. 28, 1998 (JP) .................................................. 10-377612

(51) Int. Cl.[7] ....................................................... B62D 5/04
(52) U.S. Cl. ............................... 701/42; 701/43; 180/443; 180/446
(58) Field of Search ................................... 180/443, 446; 701/41, 42, 43; 318/52, 587

(56) References Cited

U.S. PATENT DOCUMENTS

| | | | |
|---|---|---|---|
| 5,999,870 | * 12/1999 | Tatsumte et al. ..................... | 701/443 |
| 5,999,890 | * 11/1999 | Permug .................................. | 701/42 |
| 6,018,691 | * 1/2000 | Yamamoto et al. .................... | 701/43 |
| 6,032,091 | * 2/2000 | Noro et al. ........................... | 180/443 |
| 6,041,884 | * 3/2000 | Shimizu et al. ...................... | 180/443 |
| 6,050,360 | * 4/2000 | Pattak et al. ......................... | 180/443 |
| 6,091,214 | * 7/2000 | Yamauaki et al. .................... | 180/443 |
| 6,116,372 | * 9/2000 | Mukai et al. ......................... | 180/443 |
| 6,131,692 | * 10/2000 | Kawasugi ............................ | 180/443 |

FOREIGN PATENT DOCUMENTS 08108856  4/1996  (JP).

* cited by examiner

Primary Examiner—Richard M. Camby
(74) Attorney, Agent, or Firm—Merchant & Gould P.C.

(57) ABSTRACT

Control unit in an electric power steering apparatus includes a motor drive inhibition section for inhibiting output of a motor control signal on the basis of at least a steering torque signal supplied from a steering torque sensor. The control unit also includes a zero-value setting section for, when drive inhibition signals are output by the motor drive inhibition section, setting a target motor current signal to a zero value irrespective of a value of the steering torque signal, and an inhibition cancellation section for cancelling the drive inhibition signals when an offset between the target motor current signal and the detected motor current signal becomes zero after the target motor current signal is set to the zero value by the zero-value setting section. With this arrangement, instructions can be communicated bidirectionally from the motor drive inhibition section to a main power steering control where an anomaly has occurred and from the main power steering control to the inhibition cancellation section, so that the inhibition of the motor drive can be canceled promptly.

6 Claims, 11 Drawing Sheets

ELECTRIC POWER STEERING APPARATUS

BACKGROUND OF THE INVENTION

1. Field of the Invention

The present invention relates generally to electric power steering apparatuses for use in automotive vehicles which provide an electric steering assist of an electric motor to the vehicle steering system to reduce a steering effort that is to be manually applied by a vehicle operator or driver. More particularly, the present invention relates to an improved electric power steering apparatus which, in case of an anomaly or abnormal condition in a microprocessor constituting a main power steering control, turns off or deactivates the motor to prevent the motor from producing an abnormal steering assist.

2. Description of the Related Art

Various types of electric power steering apparatuses have been proposed and known today. One of the known types of electric power steering apparatuses is designed in such a manner that, once manual steering torque is applied beyond a predetermined dead zone (namely, a zone where no steering assist is produced by an electric motor, i.e., no current flows through the electric motor, in spite of a driver's steering operation to the left or right from the center or neutral position), the apparatus inhibits the operation or driving of the electric motor in a direction opposite to the direction of the driver-applied manual steering torque and prevents an abnormal target motor current from being generated due to an abnormal condition in a microprocessor constituting a main power steering control for controlling the overall operation of the motor.

More specifically, in the electric power steering apparatus of the above-mentioned type, when the microprocessor has got into an abnormal condition to generate a maximum target motor current in a single direction (e.g., rightward) irrespective of presence or absence of driver-applied manual steering torque, the motor is caused to rotate rightward. If the driver is holding the steering wheel at that time, leftward steering torque would be detected and the operation of the motor is inhibited once the detected leftward steering torque exceeds a threshold value of the dead zone. Then, as the electric motor is deactivated, the detected steering torque decreases to enter the dead zone, so that the motor is again turned on or activated and thus the detected steering torque in again increases. Such occurrences are repeated, which would cause an undesired "hunting" of steering torque in the neighborhood of the dead zone, thus creating a possibility of unstable steering characteristics.

Japanese Patent Laid-open Publication No. HEI-8-108856 discloses an electric power steering apparatus which is designed to provide a solution to the undesired hunting. Specifically, the disclosed electric power steering apparatus detects a motor current in an opposite direction to a direction of steering torque or abnormal motor current and triggers a timer upon detection of the motor current of the opposite direction to the steering torque or abnormal motor current. Then, upon lapse of a time period preset in the timer, a latch circuit is activated and a motor drive inhibition circuit is activated in response to an output signal from the latch circuit so that a motor driver circuit is deactivated to stop the motor current of the opposite direction to the steering torque or abnormal motor current. The motor drive inhibition circuit remains activated as long as the latch circuit is activated, to thereby stop the motor current of the opposite direction to the steering torque or abnormal motor current. The activated condition of the motor drive inhibition circuit continues until the latch circuit is deactivated by a non-driven state detection circuit detecting that the target motor current has reached a zero (0) level or value.

However, because of the arrangement that the motor drive inhibition circuit is activated upon lapse of the timer-set time period after detection of the motor current of the opposite direction to the steering torque or abnormal motor current, the disclosed electric power steering apparatus encounters the problem that such a motor current of the opposite direction to the steering torque or abnormal motor current would undesirably continue flowing during the timer-set time period.

Further, because the latch circuit is deactivated when the zero target motor current is detected by the non-driven state detection circuit, the disclosed electric power steering apparatus has another problem that, even when the normal operation of the microprocessor is restored, the target motor current would not decrease to the zero value as long as the steering wheel is being operated to produce steering torque, so that the latch circuit, and hence the motor drive inhibition circuit, would remain activated to thereby keep disabling the motor driver circuit. Further, when steering torque is being generated during the activation of the latch circuit, a target motor current is generated with no driving current actually flowing through the motor, and thus, in a situation where an offset between the target motor current and the actual detected motor current is subjected to PID (Proportional, Integral and Differential) control operations, the duty ratio would reach almost 100% due to the I (Integral) control operation. Consequently, the motor would be driven at the 100% duty ratio to create a possibility of an overcurrent flowing through the motor the moment the latch circuit is deactivated.

SUMMARY OF THE INVENTION

It is accordingly an object of the present invention to provide an electric power steering apparatus for an automotive vehicle which can promptly and reliably inhibit generation of an abnormal motor current due to an anomaly in a microprocessor constituting a main power steering control and also can promptly and reliably cancel the inhibition of the abnormal motor current generation.

Control unit of the electric power steering apparatus, in accordance with an aspect of the present invention, includes: a zero-value setting section for, when drive inhibition signals are output by a motor drive inhibition section, setting a target motor current signal to a zero level or value irrespective of a value of a steering torque signal output by a steering torque sensor; and an inhibition cancellation section for cancelling the drive inhibition signals when an offset between the target motor current signal and detected motor current signal becomes zero after the target motor current signal is set to the zero value by the zero-value setting section. With this arrangement, instructions can be communicated bidirectionally from the motor drive inhibition section to a main power steering control (microprocessor) where an anomaly has occurred and from the main power steering control (microprocessor) to the inhibition cancellation section, so that the inhibition of the motor drive can be canceled promptly.

The zero-value setting section in the invention includes: a zero-value generator section for, on the basis of the drive inhibition signals output by the motor drive inhibition section, detecting a motor drive inhibition condition where driving of the electric motor is to be inhibited and outputting a prestored coefficient signal of value 0 upon detection of the motor drive inhibition condition; and a multiplier for, when the motor drive inhibition condition is detected by the zero-value generator section, multiplies the target motor current signal by the coefficient of value 0 to thereby compulsorily set the target motor current signal to the zero value.

In one implementation, the zero-value generator section includes: a first storage section prestoring a value 1 as a coefficient; a second storage section prestoring a value 0 as a coefficient; a logic operator section for performing an exclusive OR operation on the drive inhibition signals output by the motor drive inhibition section, to detect whether or not the motor drive inhibition section is signaling the motor drive inhibition condition; and a selector section for selecting between the coefficient of the value 1 stored in the first storage section and the coefficient of the value 0 stored in the second storage section, to supply the coefficient of the value 1 or the coefficient of the value 0 to the multiplier for multiplication with the target motor current signal.

The above-mentioned inhibition cancellation section include: a first inverter for inverting the coefficient signal of value 0 output by the zero-value setting section; a second inverter for inverting the offset signal of value 0 output by the offset calculator section; and an AND circuit for performing an AND operation on the coefficient signal inverted by the first inverter and the offset signal inverted by the second inverter. Output from the AND circuit is supplied to the motor drive inhibition section as the inhibition cancellation signal, so as to cancel inhibition of the driving of the electric motor.

The motor drive inhibition section includes: a drive-inhibition-condition determination section for making a comparison between the steering torque signal output by the steering torque sensor and prestored reference torque values and outputs the drive inhibition signals when a result of the comparison indicates that the driving of the electric motor is to be inhibited; and an output inhibition section for, when the drive-inhibition-condition determination section determines that the driving of the electric motor is to be inhibited, inhibiting output of the motor control signal from the motor drive section to the motor in accordance with the drive inhibition signals. The motor drive inhibition section inhibits output of the motor control signal on the basis of at least the steering torque signal from the steering torque sensor and the detected motor current signal.

BRIEF DESCRIPTION OF THE DRAWINGS

Certain preferred embodiments of the present invention will be described in greater detail with reference to the accompanying sheets of drawings, in which.

DETAILED DESCRIPTION OF THE PREFERRED EMBODIMENTS

The present invention as described in detail hereinbelow is constructed to inhibit a flow of an excessive motor current or motor current of an opposite direction to the direction of manual steering torque due to an anomaly in a microprocessor constituting a main power steering control and also promptly and reliably cancel the motor current flow inhibition by communicating a zero target motor current instruction and a zero offset instruction bidirectionally between the main control and a motor drive inhibition section or motor-drive-inhibition cancellation section, to thereby improve a steering feel at the time of the motor drive inhibition and motor-drive-inhibition cancellation.

Figure 1:
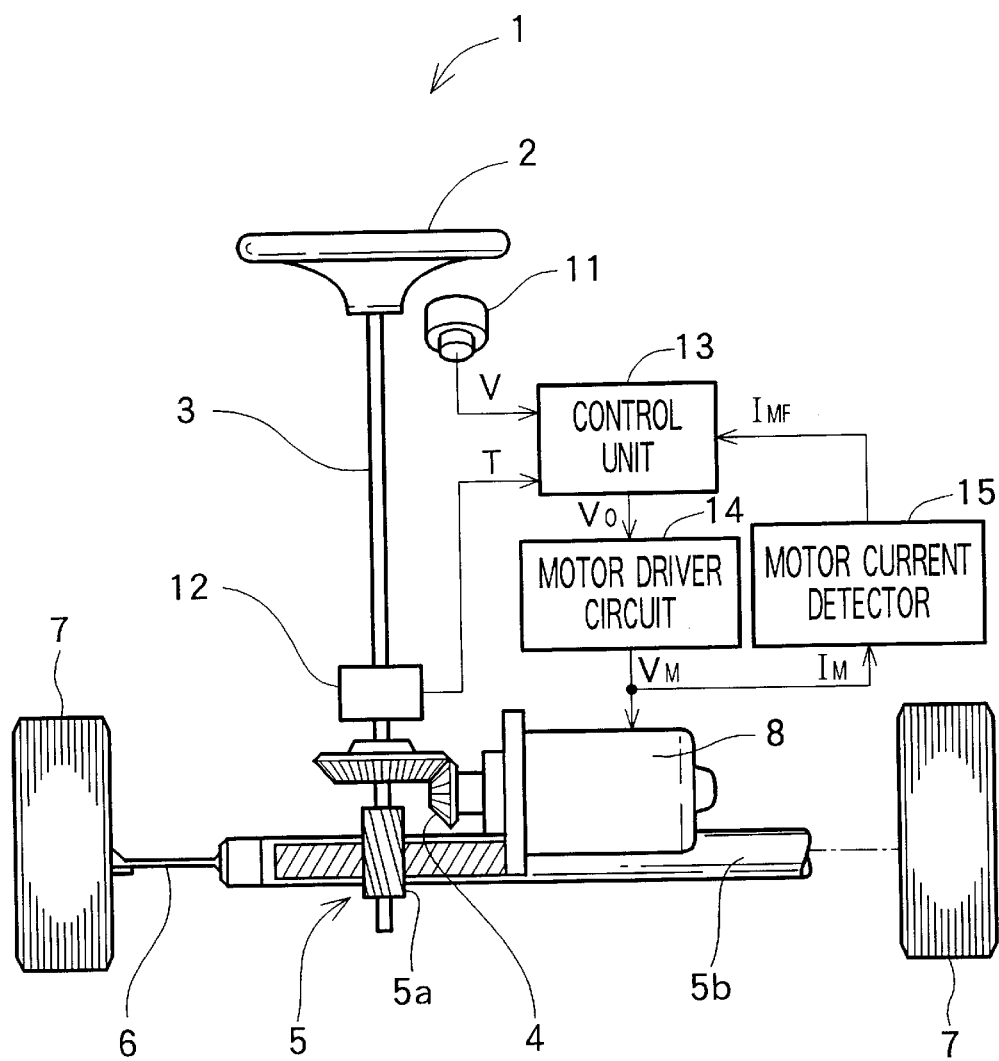
FIG. 1 is a block diagram showing a general organization of an electric power steering apparatus for an automotive vehicle according to a first embodiment of the present invention.

FIG. 1 is a block diagram showing a general organization of an electric power steering apparatus for an automotive vehicle according to a first preferred embodiment of the present invention. Mechanically, the electric power steering apparatus 1 comprises a steering wheel 2, a steering shaft 3, a hypoid gear 4, a rack-and-pinion steering gear mechanism 5 including a toothed pinion 5a and a rack shaft 5b, left and right steerable front wheels 7 connected to the opposite ends of the rack shaft 5b via tie rods 6, and an electric motor 8 for generating and supplying an electric steering assist to the vehicle steering system.

As electric components, the electric power steering apparatus 1 comprises a vehicle velocity sensor 11, a steering torque sensor 12, a control unit 13, a motor driver circuit 14 and a motor current detector 15.

The vehicle velocity sensor 11 detects a velocity of the automotive vehicle and generates a vehicle velocity signal V that is an electric signal representing the detected vehicle velocity. The steering torque sensor 12 detects steering torque manually applied to the steering wheel 2 and generates a steering torque signal T that is an electric signal representing the detected steering torque. The steering torque signal T, which has intensity and direction (i.e., polarity), is supplied to the control unit 13 for processing to be described later. In the following description, the direction or polarity of the steering torque signal T is assumed to be positive (plus) when the steering torque is in the clockwise direction and negative (minus) when the detected steering torque are in the counterclockwise direction.

The control unit 13 of the electric steering apparatus 1, which comprises a microprocessor, a memory etc., generates a target motor current signal corresponding at least to the steering torque signal T, as well as an ultimate motor control signal $V_O$ corresponding to the target motor current signal. Thus, the control unit 13 controls the motor 8 with a PWM (Pulse-Width-Modulated) motor voltage $V_M$ by means of the motor driver circuit 14.

The motor driver circuit 14 includes a bridge circuit composed of a plurality of (e.g., four) switching elements, such as power FETs (Field Effect Transistors) or IGBTs (Insulated-Gate Bipolar Transistors), and generates the PWM motor voltage $V_M$ on the basis of the ultimate motor control signal $V_O$ so that the motor 8 is driven to rotate in the forward or reverse direction in response to the motor voltage $V_M$.

The motor current detector 15 converts an actual or detected motor current $I_M$ into voltage by means of a resistor, Hall effect device or the like connected in series with the electric motor 8, and sends a detected motor current signal $I_{MF}$, representing the motor current $I_M$, to the control unit 13 for negative feedback to the target motor current signal $I_{MS}$.

As the vehicle driver turns the steering wheel 2 to the left or right, the manual steering torque applied to the steering shaft 3 is converted, via the rack-and-pinion steering gear mechanism 5, into an axial linear movement of the rack shaft 5b, which changes the direction of the steerable front wheels 7 by way of the tie rods 6. To assist the driver's manual steering effort, the electric motor 8 is driven in accordance with the steering torque signal T, and output power or torque thus generated by the electric motor 8 is increased twofold via the hypoid gear 4 and applied to the steering shaft 3 as electric steering assist torque to reduce the driver's manual steering effort.

Figure 2:
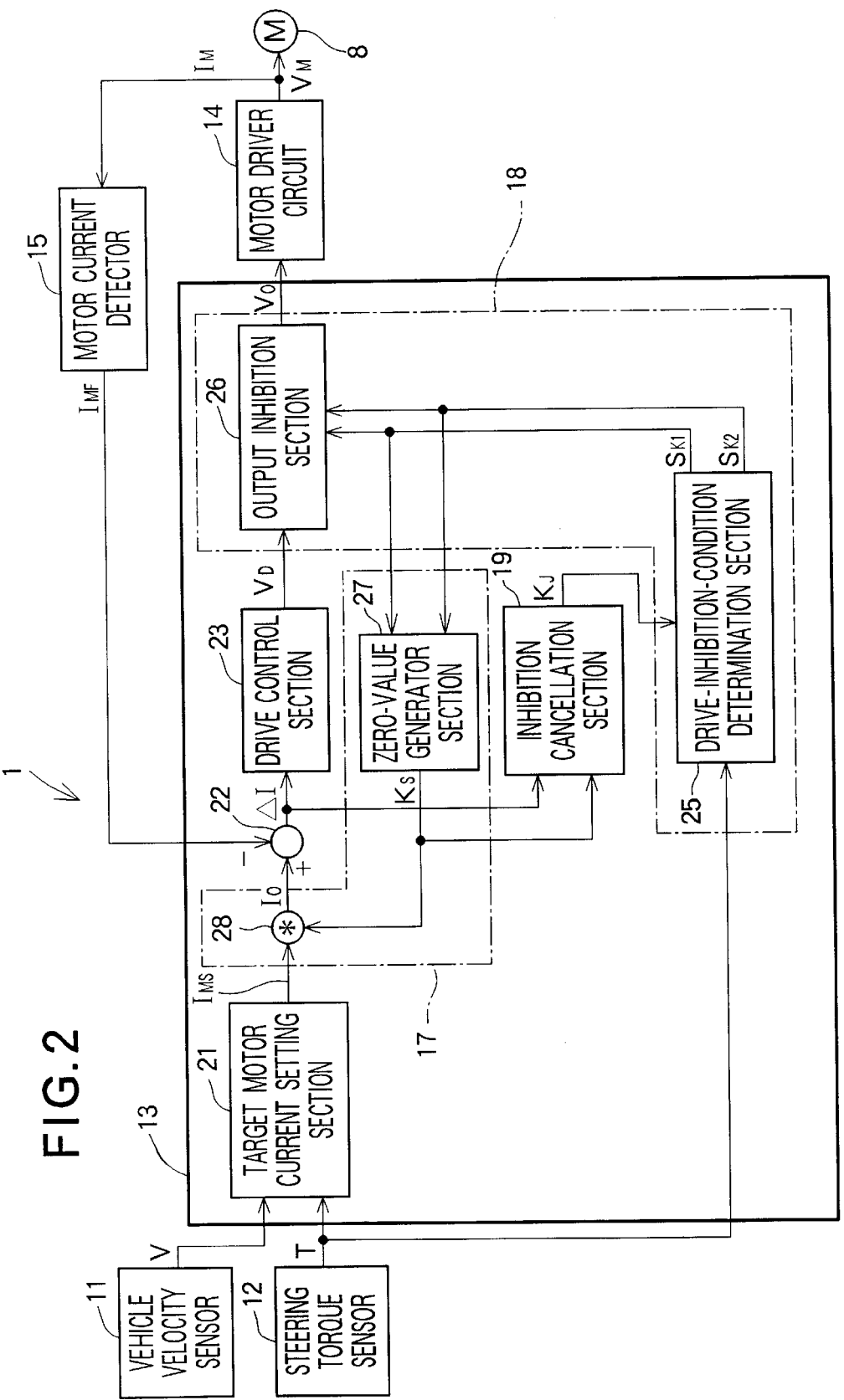
FIG. 2 is a functional block diagram of a control unit employed in the electric power steering apparatus of FIG. 1.

FIG. 2 is a functional block diagram of the control unit 13 in the electric power steering apparatus 1 of FIG. 1. The control unit 13 includes a target motor current setting section 21 for setting a target motor current signal corresponding at least to the detected steering torque signal T, an offset calculator section 22 for calculating a difference or offset between values of the target motor current signal and the detected motor current signal, and a drive control section 23 for generating the ultimate motor control signal $V_O$ (e.g., a composite of ON/OFF signal and PWM signal) based on the difference (negative feedback) between the values of the target motor current signal and the detected motor current signal $I_{MF}$ corresponding to the motor current $I_M$ detected by the motor current detector 15. The control unit 13 controls operation of the motor driver circuit 14 so that the difference or offset between the target motor current signal and the detected motor current signal $I_{MF}$ promptly becomes zero (0).

The control unit 13 also includes a motor drive inhibition section 18 that inhibits output of the motor control signal $V_O$ on the basis of the steering torque signal T or a combination of the steering torque signal T and detected motor current signal $I_{MF}$. More specifically, this motor drive inhibition section 18 generates drive inhibition signals $S_{K1}$ and $S_{K2}$ for inhibiting output of the motor control signal $V_O$ within a value range to be limited in correspondence with the steering torque signal T or the motor control signal $V_O$ within a value range to be limited in correspondence with the combination of the steering torque signal T and detected motor current signal $I_{MF}$.

The control unit 13 further includes a zero-value setting section 17 that, when the drive inhibition signals $S_{K1}$ and $S_{K2}$ are output from the motor drive inhibition section 18, sets the target motor current signal $I_{MS}$ to a zero value irrespective of the value of the steering torque signal T, and an inhibition cancellation section 19 that cancels the drive inhibition signals $S_{K1}$ and $S_{K2}$ when the offset between the values of the target motor current signal and detected motor current signal becomes zero after the target motor current signal $I_{MS}$ is set to the zero value by the zero-value setting section 17.

The above-mentioned target motor current setting section 21, offset calculator section 22, drive control section 23 and zero-value setting section 17 together constitute the microprocessor-based main power steering control in the inventive steering apparatus. The motor drive inhibition section 18 and inhibition cancellation section 19, on the other hand, together constitute a subsidiary power steering control that is based on a digital circuit made up of a microprocessor and other discrete components.

Figure 11:
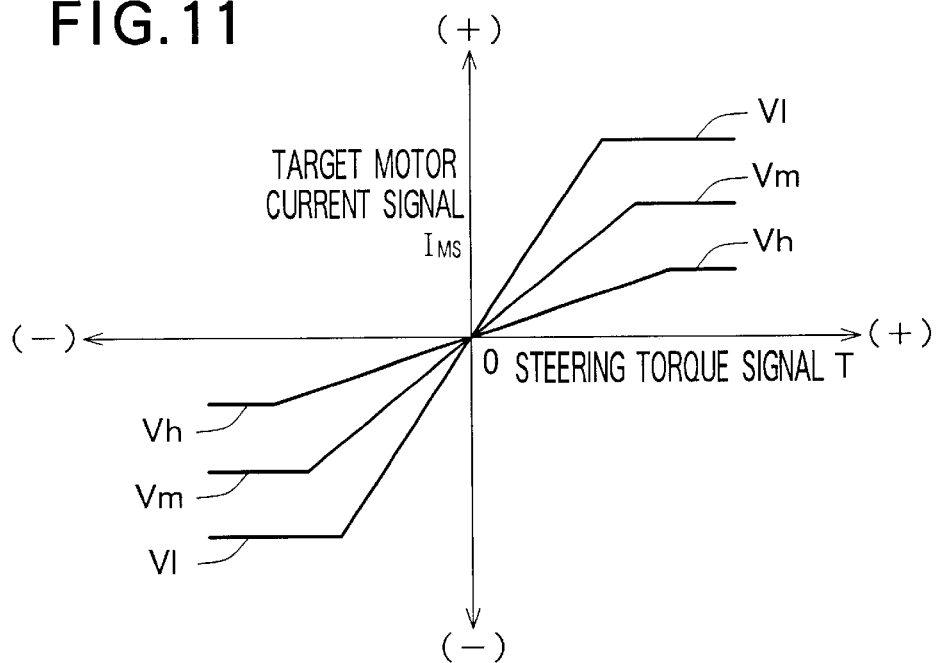
FIG. 11 is a diagram showing an exemplary control curve of a target motor current signal versus a steering torque signal with a vehicle velocity used as a parameter.

The target motor current setting section 21 of the control unit 13 includes a memory, such as a ROM, which has prestored therein data indicative of a control curve of the target motor current signal $I_{MS}$ versus the steering torque signal T with the vehicle velocity V as a parameter, as shown in FIG. 11, where "$V_1$" represents a low vehicle velocity level, "$V_m$" a medium vehicle velocity level and "$V_h$" a high vehicle velocity level. Upon receipt of the steering torque signal T from the steering torque sensor 12 and the vehicle velocity signal V from the vehicle velocity sensor 11, the target motor current setting section 21 reads out one of the prestored data or values of the target motor current signal $I_{MS}$ corresponding to the values of the received steering torque signal T and vehicle velocity signal V and passes the read-out value to the zero-value setting section 17 as the target motor current signal $I_{MS}$. As clear from FIG. 11, the target motor current signal $I_{MS}$ in the preferred embodiment is set to decrease in value relative to the steering torque T as the vehicle velocity V increases ($V_1 \rightarrow V_m \rightarrow V_h$), so that great electric steering assist torque is given at low vehicle velocities while stable vehicle behavior is achieved at high vehicle velocities.

The offset calculator section 22 computes a difference or offset ΔI between values of a modified target motor current signal $I_O$ supplied from the zero-value setting section 17 and the detected motor current signal $I_{MF}$ from the motor current detector 15 (i.e., $\Delta I = I_O - I_{MF}$) and then supplies the drive control section 23 with an electric signal indicative of the thus-computed offset ΔI. By thus employing the offset ΔI between the modified target motor current signal $I_O$ and the detected motor current signal $I_{MF}$, the control unit 13 forms a negative feedback loop.

Figure 7:
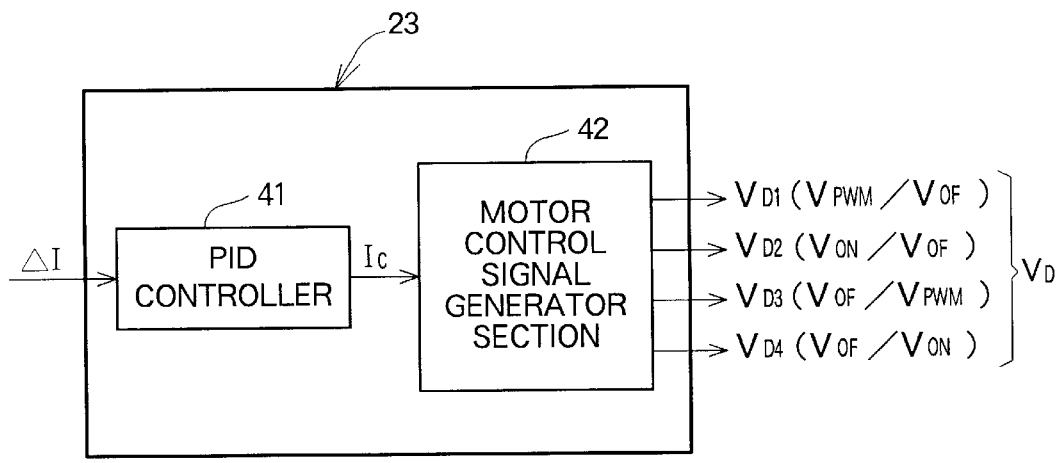
FIG. 7 is a diagram showing an exemplary circuit structure of a drive control section shown in FIG. 2.

As shown in FIG. 7, the drive control section 23 includes a PID controller 41 and a motor control signal generator section 42. The drive control section 23 performs P (Proportional) control, I (Integral) control and D (Differential) control on the offset signal ΔI fed from the offset calculator section 22, and the motor control signal generator section 42 generates a motor control signal $V_D$ on the basis of the offset signal ΔI having undergone the above-mentioned PID control. The thus-generated motor control signal $V_D$ is supplied to the motor drive inhibition section 18.

The motor drive inhibition section 18 outputs the drive inhibition signals $S_{K1}$ and $S_{K2}$ for inhibiting output of the motor control signal $V_D$, on the basis of the steering torque signal T supplied from the torque sensor 12. The motor drive inhibition section 18 includes a drive-inhibition-condition determination section 25 and an output inhibition section 26. The drive-inhibition-condition determination section 25 in the first embodiment includes a memory, such as a ROM, a comparator section and an output section. Thus, the drive-inhibition-condition determination section 25 makes a comparison between the steering torque signal T given from the torque sensor 12 and a plus reference torque value $T_P$ (or minus reference torque value $-T_P$) prestored in memory and supplies the output inhibition section 26 and zero-value setting section 17 with the drive inhibition signals $S_{K1}$ and $S_{K2}$ corresponding to the result of the comparison.

When the drive inhibition signals $S_{K1}$ and $S_{K2}$ are supplied from the motor drive inhibition section 18, the zero-value setting section 17, which includes a zero-value generator section 27 and a multiplier 28, sets the target motor current signal $I_{MS}$ to a zero value irrespective of the value of the steering torque signal T. The zero-value generator section 27, including a logic operator and a memory such as a ROM, detects a motor drive inhibition condition of the electric motor 8 on the basis of the drive inhibition signals $S_{K1}$ and $S_{K2}$ supplied from the motor drive inhibition section 18 and then supplies a prestored coefficient $K_S$ of value "0" to the multiplier 28. When the motor drive inhibition condition of the electric motor 8 is not being detected, the zero-value generator section 27 supplies a prestored coefficient $K_S$ of value "1" to the multiplier 28.

When the zero-value generator section 27 is detecting the drive inhibition condition of the electric motor 8, the multiplier 28 multiplies the target motor current signal $I_{MS}$ from the section 21 by the "0" coefficient $K_S$ from the zero-value generator section 27, to compulsorily set the modified target motor current signal $I_O$ to the zero value. The thus-set modified target motor current signal $I_O$ is supplied to the offset calculator section 22. When the zero-value generator section 27 is not detecting the drive inhibition condition of the electric motor 8, the multiplier 28 multiplies the target motor current signal $I_{MS}$ by the "1" coefficient $K_S$ given from the zero-value generator section 27, to supply the offset calculator section 22 with the target motor current signal $I_{MS}$ itself as the modified target motor current signal $I_O$.

Figure 3:
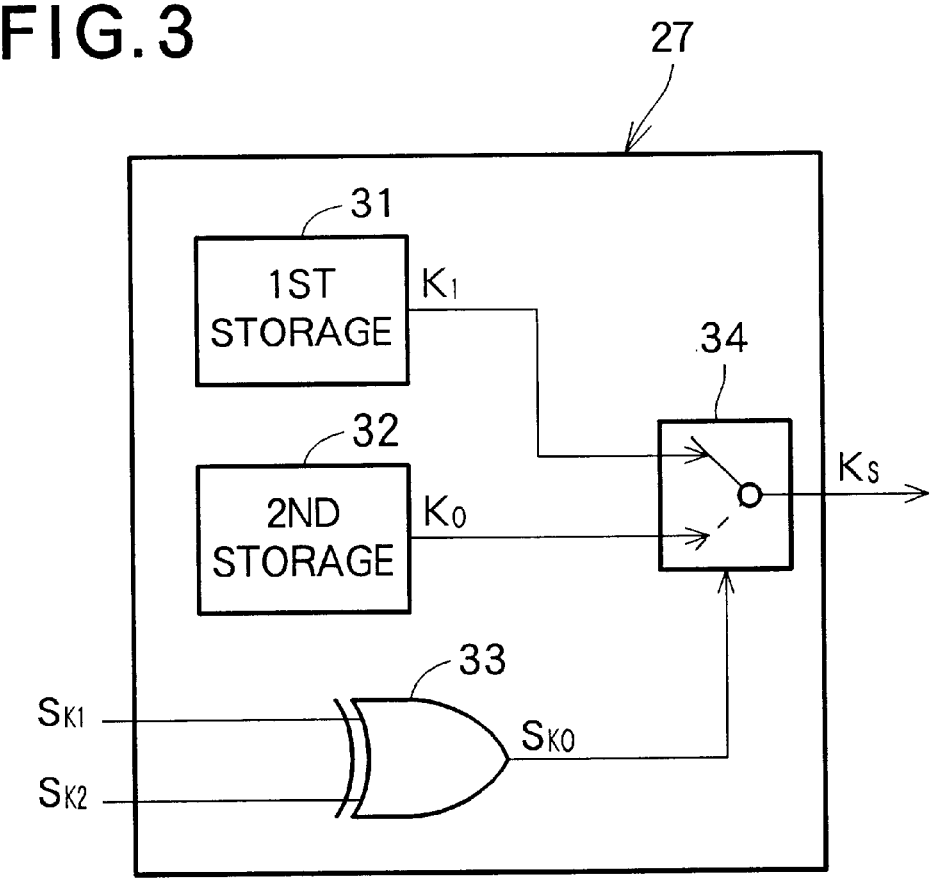
FIG. 3 is a block diagram showing in detail an exemplary construction of a zero-value generator section shown in FIG. 2.

FIG. 3 is a block diagram showing an exemplary detailed construction of the zero-value generator section 27 shown in FIG. 2. In the illustrated example of FIG. 3, the zero-value generator section 27 includes a first storage section 31, a second storage section 32, a logic operator 33 and a selector section 34. The first storage section 31 comprises a memory, such as a ROM, having stored therein a coefficient "1" that is passed to the selector section 34 as a coefficient signal $K_1$. The second storage section 32 also comprises a memory, such as a ROM, having stored therein a coefficient "0" that is passed to the selector section 34 as a coefficient signal $K_0$.

The logic operator 33 has an exclusive OR function. More specifically, the logic operator 33 performs an exclusive OR operation on the drive inhibition signals $S_{K1}$ and $S_{K2}$ supplied from the drive-inhibition-condition determination section 25 of the motor drive inhibition section 18 as shown in FIG. 2, to thereby detect whether the motor drive inhibition condition has been identified by the determination section 25. Detection signal $S_{K0}$ output from the logic operator 33 is passed to the selector section 34. More specifically, when the drive inhibition signals $S_{K1}$ and $S_{K2}$ are both at high (H) level, for example, the logic operator 33 passes, to the selector section 34, a low (L)-level detection signal $S_{K0}$ indicating that the electric motor 8 is to be driven. When one of the drive inhibition signals $S_{K1}$ or $S_{K2}$ is at high level and the other of the drive inhibition signals $S_{K2}$ or $S_{K1}$ is at low level, the logic operator 33 passes, to the selector section 34, a high-level detection signal $S_{K0}$ indicating that the operation or driving of the electric motor 8 is to be inhibited.

The selector section 34, on the basis of the detection signal $S_{K0}$ from the logic operator 33, selects either the coefficient signal of value 1 $K_1$ supplied from the first storage section 31 or the coefficient signal $K_0$ of value 0 supplied from the second storage section 32, and passes the selected coefficient $K_1$ or $K_0$ to the multiplier 28 as the coefficient $K_S$. More specifically, when the detection signal $S_{K0}$ is at low level, the selector section 34 determines that the motor 8 is to be driven and thus selects the coefficient $K_1$ to thereby output the coefficient $K_S$ of value "1". When the detection signal $S_{K0}$ is at high level, the selector section 34 determines that the driving of the motor 8 is to be inhibited and thus selects the coefficient $K_0$ to thereby output the coefficient $K_S$ of value "0".

As mentioned, when the condition for driving the motor 8 is detected, the zero-value setting section 17 of FIG. 2 is caused to output the coefficient $K_S$ of value 1 to the multiplier 28, which in turn multiplies the target motor current signal $I_{MS}$ supplied from the target motor current setting section 21 by the coefficient "1" $K_S$, so that the target motor current signal $I_{MS}$ unmodified in value is output from the zero-value setting section 17 as the modified target motor current $I_O$.

When, on the other hand, the condition for inhibiting the driving of the motor 8 (i.e., motor drive inhibition condition) is detected, the zero-value setting section 17 is caused to output the coefficient $K_S$ of value 0 to the multiplier 28, which thus multiplies the target motor current signal $I_{MS}$ supplied from the target motor current setting section 21 by the coefficient "0" $K_S$, so that the target motor current signal $I_{MS}$ having been compulsorily set to the zero value is output from the zero-value setting section 17 as the modified target motor current $I_O$.

Figure 4:
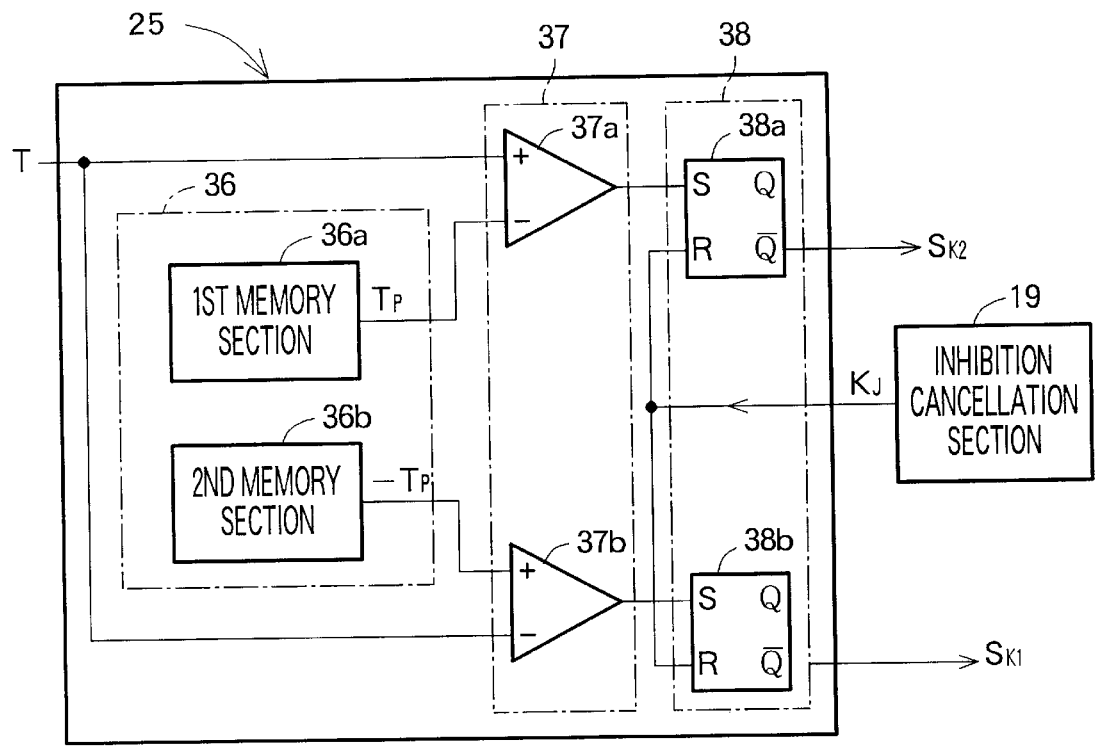
FIG. 4 is a block diagram showing in detail an exemplary construction of a drive-inhibition-condition determination section shown in FIG. 2.

FIG. 4 is a block diagram showing in detail an exemplary structure of the drive-inhibition-condition determination section 25 in the motor drive inhibition section 18. In the illustrated example of FIG. 4, the drive-inhibition-condition determination section 25 includes a torque value storage section 36, a comparator section 37 and an inhibition signal output section 38. The torque value storage section 36 comprises a memory such as a ROM, where there are provided a first memory section 36a for storing a positive or plus (+) reference torque value $T_P$, and a second memory section 36b for storing a negative or minus (−) reference torque value $-T_P$. The plus reference torque value $T_P$ and minus reference torque value $-T_P$ are both supplied to the comparator section 37.

The comparator section 37 includes first and second comparators 37a and 37b. The first comparator 37a makes a comparison between the plus reference torque value $T_P$ from the first memory section 36a and the steering torque signal T from the steering torque sensor 12. Result of the comparison by the first comparator 37a is passed to a first flip-flop 38a of the inhibition signal output section 38, via which it is supplied to the output inhibition section 26 (FIG. 2) as the drive inhibition signal $S_{K2}$.

When the value of the steering torque signal T is equal to or smaller than the plus reference torque value $T_P$ ($T \leq T_P$), the first comparator 37a gives a low level signal to a set (S) terminal of the flip-flop 38a. Then, the flip-flop 38a provides, through one of its outputs ($\overline{Q}$), a high-level drive inhibition signal $S_{K2}$ as the inversion of the low-level input signal to the set (S) terminal. The high-level drive inhibition signal $S_{K2}$ is supplied to the output inhibition section 26 as mentioned above. When, on the other hand, the value of the steering torque signal T is greater than the plus reference torque value $T_P$ ($T > T_P$), the first comparator 37a gives a high level signal to the set (S) terminal of the flip-flop 38a, in response to which the flip-flop 38a is set to provide, through the output ($\overline{Q}$), a low-level drive inhibition signal $S_{K2}$ as the inversion of the high-level input signal to the set (S) terminal. The high-level drive inhibition signal $S_{K2}$ is supplied to the output inhibition section 26 as mentioned above. The high-level drive inhibition signal $S_{K2}$ permits the electric motor 8 to rotate in the reverse direction (to give a leftward steering assist), while the low-level drive inhibition signal $S_{K2}$ inhibits the electric motor 8 from rotating in the reverse direction (i.e., inhibits the leftward steering assist).

The second comparator 37b makes a comparison between the minus reference torque value $-T_P$ from the second memory section 36b and the steering torque signal T from the steering torque sensor 12. Result of the comparison by the second comparator 37b is passed to a second flip-flop 38b of the inhibition signal output section 38, via which it is supplied to the output inhibition section 26 (FIG. 2) as the drive inhibition signal $S_{K1}$.

When the value of the steering torque signal T is equal to or smaller than the minus reference torque value $-T_P$ ($T \leq -T_P$), the second comparator 37b gives a high level signal to a set (S) terminal of the flip-flop 38b. Then, the second flip-flop 38b provides, through one of its outputs ($\overline{Q}$), a low-level drive inhibition signal $S_{K1}$ as the inversion of the high-level input signal to the set (S) terminal. The low-level drive inhibition signal $S_{K1}$ is supplied to the output inhibition section 26 of FIG. 2. When, on the other hand, the value of the steering torque signal T is greater than the minus reference torque value $-T_P$ ($T > -T_P$), the second comparator 37b gives a low level signal to the set (S) terminal of the flip-flop 38b, in response to which the flip-flop 38b is set to provide, through the output ($\overline{Q}$), a high-level drive inhibition signal $S_{K1}$ as the inversion of the low-level input signal to the set (S) terminal. The high-level drive inhibition signal $S_{K1}$ is supplied to the output inhibition section 26 similarly to the above-mentioned. The high-level drive inhibition signal $S_{K1}$ permits the electric motor 8 to rotate in the forward direction (to give a rightward steering assist), while the low-level drive inhibition signal $S_{K1}$ inhibits the electric motor 8 from rotating in the forward direction (i.e., inhibits the rightward steering assist).

Figure 13:
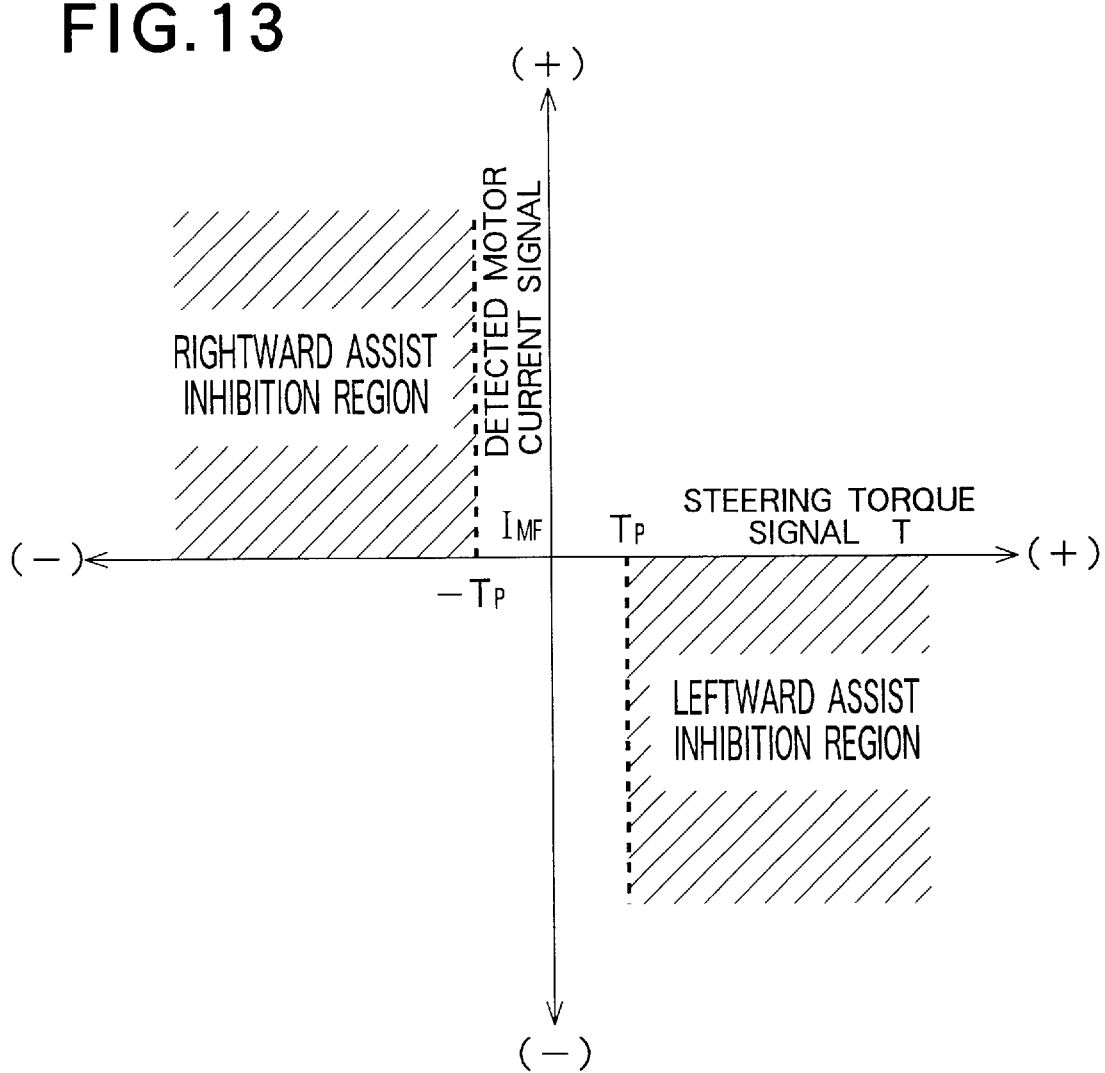
FIG. 13 is a diagram illustrating regions where output of a detected motor current signal is inhibited by the drive-inhibition-condition determination section of FIG. 4 depending on the value of the steering torque signal.

FIG. 13 is a diagram illustrating regions where output of the detected motor current signal $I_{MF}$ is inhibited by the drive-inhibition-condition determination section depending on the value of the steering torque signal T. In the example of FIG. 13, output of the minus (−) or negative detected motor current signal $I_{MF}$ is inhibited over the region where the value of the steering torque signal T exceeds the plus reference torque value $T_P$ ($T > T_P$) (hereinafter, "rightward assist inhibition region"). Output of the plus (+) or positive detected motor current signal $I_{MF}$ is inhibited over the region where the value of the steering torque signal T is below the minus reference torque value $-T_P$ ($T < -T_P$) (hereinafter, "leftward assist inhibition region"). Note that the rightward assist inhibition corresponds to inhibiting the motor 8 from rotating in the reverse direction while the rightward assist inhibition corresponds to inhibiting the motor 8 from rotating in the forward direction.

The inhibition cancellation section 19 of FIG. 4 functions to cancel the rightward and leftward assist inhibition regions shown in FIG. 13. Namely, the inhibition cancellation section 19 outputs the high-level drive inhibition signals $S_{K1}$ and $S_{K2}$ by supplying a high-level cancellation signal $K_J$ to respective reset (R) input terminals of the first and second flip-flops 38a and 38b to thereby reset the flip-flops 38a and 38b.

Figure 5:
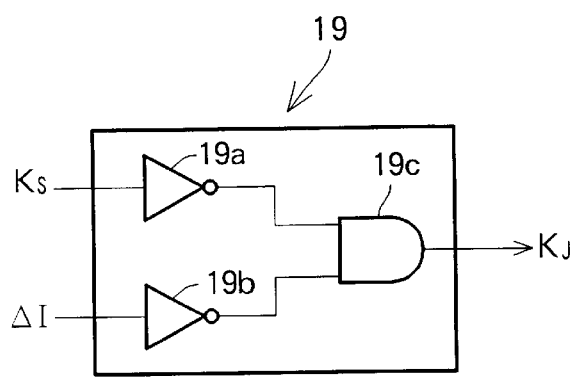
FIG. 5 is a diagram showing an exemplary circuit structure of an inhibition cancellation section shown in FIG. 2.

FIG. 5 is a diagram showing an exemplary circuit structure of the inhibition cancellation section 19 shown in FIG. 2, which, as shown, includes first and second inverters 19a and 19b and an AND gate 19c. The first inverter 19a inverts the polarity of the coefficient $K_S$ of value 0 supplied from the zero-value generator section 27 of FIG. 2 and gives a resultant high level signal to the AND gate 19c; in an alternative, the modified target motor current signal $I_O$ (=0), rather than the coefficient $K_S$ of value 0, may be given to the AND gate 19c. The second inverter 19b inverts the polarity of the offset signal $\Delta I$ (=$I_O - I_{MF}$) of value 0 supplied from the offset calculator section 22 of FIG. 2 and gives a resultant high level signal to the AND gate 19c.

The AND gate 19c performs an AND operation on the high level signal derived by the first inverter 19a inverting the coefficient $K_S$ of value 0 and the high level signal derived by the second inverter 19b inverting the offset signal $\Delta I$ of value 0 and thereby gives a high-level cancellation signal $K_J$ to the drive-inhibition-condition determination section 25 so that the drive inhibition signals $S_{K1}$ and $S_{K2}$ are compulsorily set to high level to cancel the motor drive inhibition.

Further, the output inhibition section 26 of FIG. 2, on the basis of the logical levels of the drive inhibition signals $S_{K1}$ and $S_{K2}$ given from the drive-inhibition-condition determination section 25, supplies the motor control signal $V_D$ to the motor driver circuit 14 as the ultimate motor control signal $V_O$, or inhibits the supply of the motor control signal $V_O$ to the motor driver circuit 14.

Figure 6:
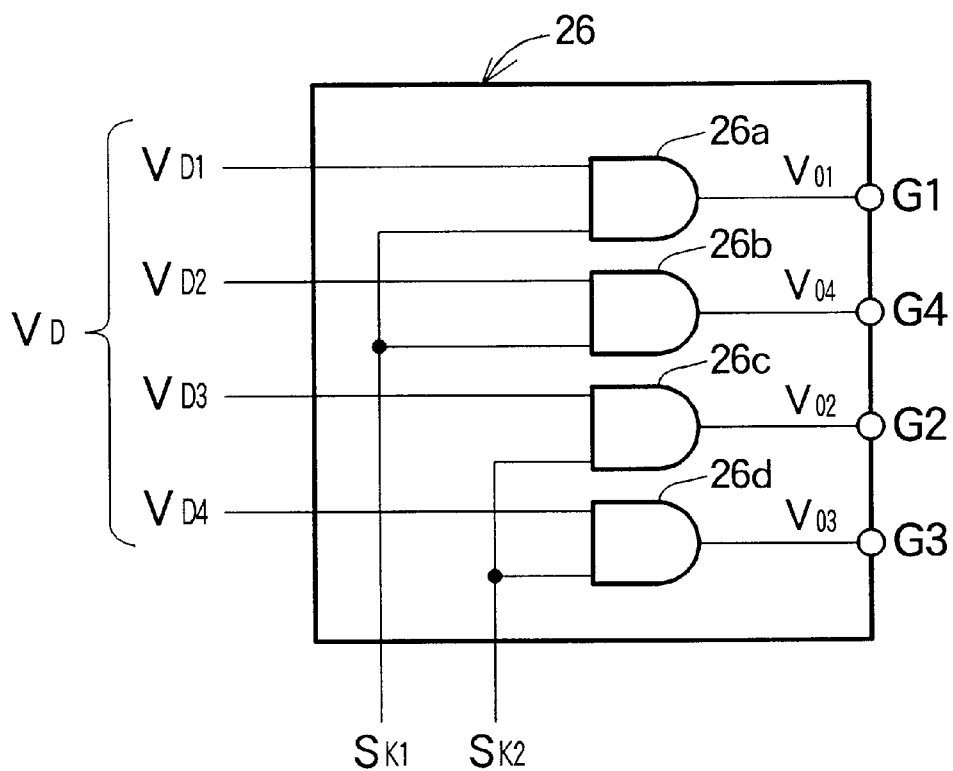
FIG. 6 is a diagram showing an exemplary circuit structure of an output inhibition section shown in FIG. 2.

FIG. 6 is a diagram showing an exemplary circuit structure of the output inhibition section 26, which includes four two-input AND gates 26a, 26b, 26c and 26d. To respective one input terminals of the AND gates 26a, 26b, 26c, 26d are supplied four motor control signals $V_{D1}$, $V_{D2}$, $V_{D3}$ and $V_{D4}$, respectively, that together constitute the motor control signal $V_D$ to be supplied from the drive control section 23 shown in FIG. 2.

FIG. 7 is a diagram showing an exemplary circuit structure of the drive control section 23, which includes the PID controller 41 and the motor control signal generator section 42. The PID controller 41 performs PID (Proportional, Integral and Differential) control operations on the offset signal $\Delta I$ supplied from the offset calculator section 22 of FIG. 2. Signal $I_C$ having undergone the PID control is then passed to the motor control signal generator section 42.

The motor control signal generator section 42 includes a PWM (Pulse-Width-Modulated) signal generator section and an ON/OFF signal generator section. On the basis of the PID-controlled signal $I_C$ supplied from the PID controller 41 and when the offset signal $\Delta I$ is of the positive or plus polarity, the motor control signal generator section 42 supplies a PWM signal $V_{PWM}$, ON signal $V_{ON}$, OFF signal $V_{OFF}$ and OFF signal $V_{OFF}$, as the motor control signals $V_{D1}$, $V_{D2}$, $V_{D3}$ and $V_{D4}$ respectively, to the respective one input terminals of the AND gates 26a, 26b, 26c and 26d of the output inhibition section 26 shown in FIG. 6. When the offset signal ΔI is of the negative or minus polarity, the motor control signal generator section 42 supplies an OFF signal $V_{OFF}$, OFF signal $V_{OFF}$, PWM signal $V_{PWM}$ and ON signal $V_{ON}$, as the motor control signals $V_{D1}$, $V_{D2}$, $V_{D3}$ and $V_{D4}$ respectively, to the respective one input terminals of the AND gates 26a, 26b, 26c and 26d of the output inhibition section 26.

Referring back to FIG. 6, the drive inhibition signal $S_{K1}$ given from the drive-inhibition-condition determination section 25 is supplied to the respective other input terminals of the AND gates 26a and 26b, and the drive inhibition signal $S_{K2}$ given from the drive-inhibition-condition determination section 25 is supplied to the respective other input terminals of the AND gates 26c and 26d.

When the drive inhibition signals $S_{K1}$ and $S_{K2}$ given from the drive-inhibition-condition determination section 25 are both at high level, the output inhibition section 26 outputs the motor control signal $V_D$ ($V_{D1}$, $V_{D2}$, $V_{D3}$ and $V_{D4}$), supplied from the motor control signal generator section 42, directly as the ultimate motor control signal $V_O$ ($V_{O1}$, $V_{O4}$, $V_{O2}$ and $V_{O3}$).

When the drive inhibition signal $S_{K1}$ given from the drive-inhibition-condition determination section 25 is at high level and the drive inhibition signal $S_{K2}$ is at low level, the output inhibition section 26 outputs the motor control signals $V_{D1}$ and $VD_{D2}$ from the AND gates 26a and 26b, to which the drive inhibition signal $S_{K1}$ has been input, as the ultimate motor control signals $V_{O1}$ and $V_{O2}$, but inhibits output of the motor control signals $V_{D3}$ and $V_{D4}$ from the AND gates 26c and 26d, to which the drive inhibition signal $S_{K2}$ has been input.

Conversely, when the drive inhibition signal $S_{K1}$ given from the drive-inhibition-condition determination section 25 is at low level and the drive inhibition signal $S_{K2}$ is at high level, the output inhibition section 26 inhibits output of the motor control signals $V_{D1}$ and $V_{D2}$ from the AND gates 26a and 26b to which the drive inhibition signal $S_{K1}$ has been input, but outputs the motor control signals $V_{D3}$ and $V_{D4}$ from the AND gates 26c and 26d, to which the drive inhibition signal $S_{K2}$ has been input, as the ultimate motor control signals $V_{O2}$ and $V_{O3}$.

Figure 8:
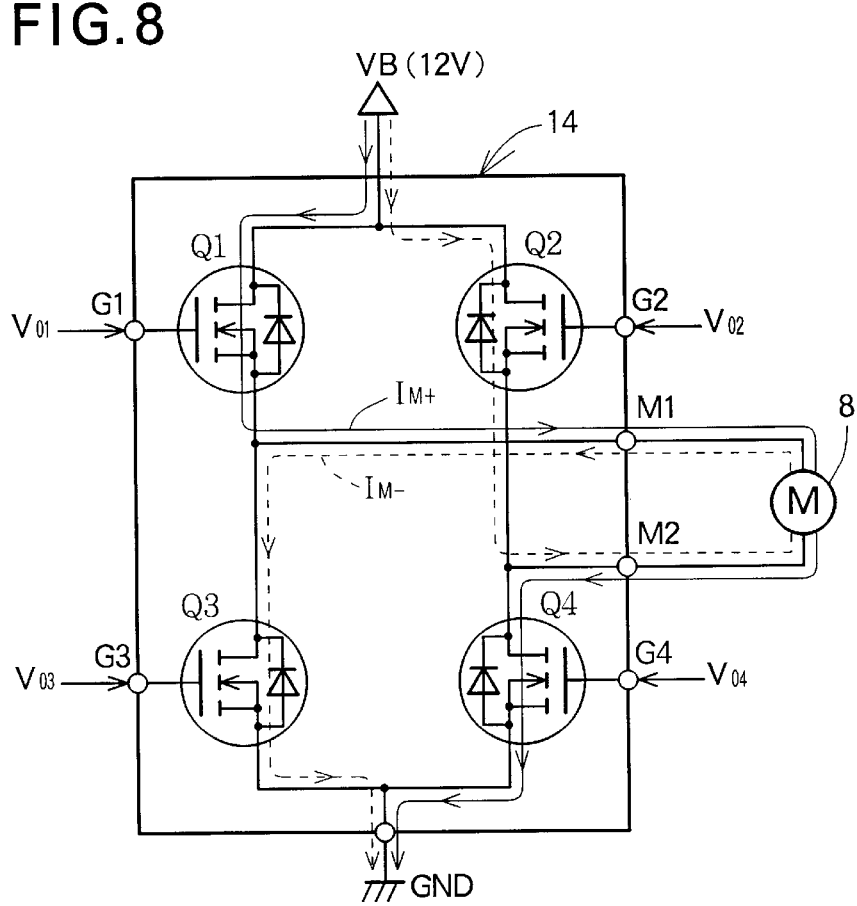
FIG. 8 is a diagram showing an exemplary organization of a motor driver circuit shown in FIG. 2 which is in the form of an FET bridge arrangement.

FIG. 8 is a diagram showing an exemplary organization of the motor driver circuit 14 comprising an FET bridge circuit, which includes four FETs (Field Effect Transistors) Q1–Q4. The motor control signals $V_{O1}$, $V_{O2}$, $V_{O3}$ and $V_{O4}$ are supplied to the gates G1, G2, G3 and G4 of the FETs Q1, Q2, Q3 and Q4, respectively.

By supplying the gate G1 of the first FET Q1 with the pulse-width-modulated (PWM) signal $V_{PWM}$ as the motor control signal $V_{OOO1}$, supplying the gate G4 of the fourth FET Q4 with the ON signal $V_{ON}$ as the motor control signals $V_{O4}$ and supplying the gates G2 and G3 of the second and third FETs Q2 and Q3 with the OFF signals $V_{OFF}$ as the motor control signals $V_{O2}$ and $V_{O3}$, a motor current $I_{M+}$ is caused to flow from a battery VB (12V), through the first FET Q1, terminal M1, motor 8, terminal M2 and fourth FET Q4, to the ground (GND), so that the motor 8 is rotated in the forward direction.

By supplying the gate G2 of the second FET Q2 with the pulse-width-modulated (PWM) signal $V_{PWM}$ as the motor control signal $V_{O2}$, supplying the gate G3 of the third FET Q3 with the ON signal $V_{ON}$ as the motor control signals $V_{O3}$ and supplying the gates G1 and G4 of the first and fourth FETs Q1 and Q4 with the OFF signals $V_{OFF}$ as the motor control signals $V_{O1}$ and $V_{O4}$, a motor current $I_{M-}$ is caused to flow from the battery VB (12V), through the second FET Q2, terminal M2, motor 8, terminal M1 and third FET Q3, to the ground (GND), so that the motor 8 is rotated in the reverse direction.

In the described embodiment, the drive inhibition section 18 controls the operation of the motor 8 by permitting or inhibiting the passage of the motor control signals $V_{O1}$–$V_{O4}$ to the gates of the FETs Q1–Q4.

Now, operation of the zero-value setting section 17, drive inhibition section 18 and inhibition cancellation section 19 will be described in relation to a situation where there has occurred an abnormal condition or anomaly in the microprocessor constituting the main power steering control of the steering apparatus as shown in FIG. 2.

Figure 12:
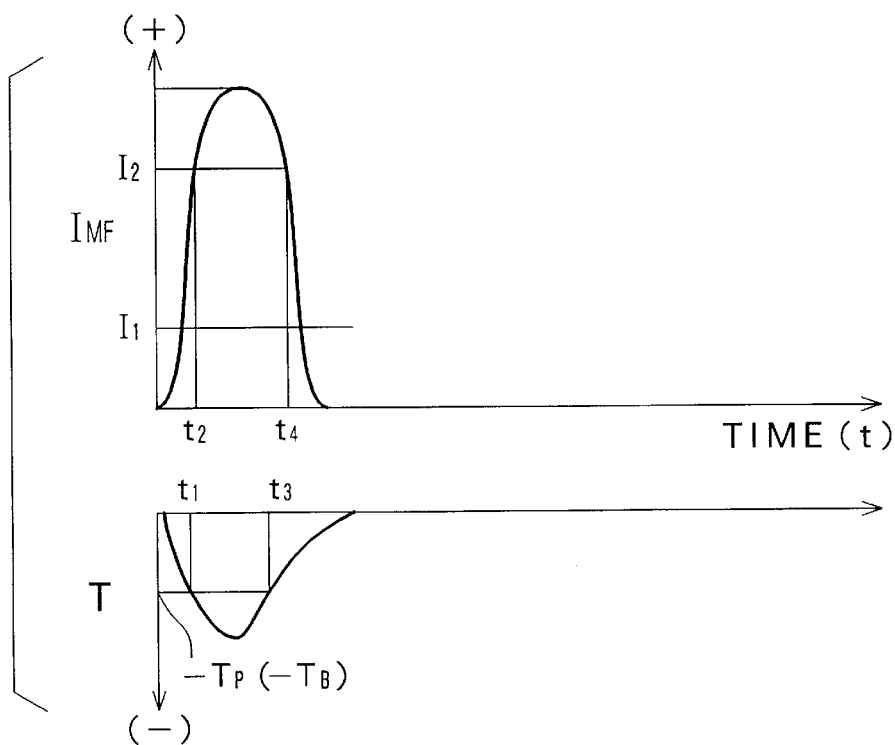
FIG. 12 is a diagram illustrating exemplary relationship between an anomaly in a microprocessor constituting a main power steering control and the steering torque signal.

FIG. 12 is a diagram illustrating exemplary relationship between the anomaly in the microprocessor and the steering torque signal T. In the illustrated example of FIG. 12, if the target motor current $I_{MS}$ reaches a maximum positive or plus (+) value, due to the microprocessor anomaly, irrespective of presence or absence of the steering torque signal T, the plus motor current $I_{M+}$ is caused to flow through the motor 8, so that the motor 8 is rotated in the forward direction and the motor current $I_{MF}$ detected by the motor current detector 15 reaches a maximum plus value. Thus, a rightward maximum steering assist is applied to the vehicle steering system, which would cause the steering wheel to rotate spontaneously without the driver actually operating the steering wheel. If the driver holds the steering wheel to prevent the spontaneous rotation of the steering wheel, then a minus (−) steering torque signal T would occur as shown in FIG. 12. The following description is made on the assumption of the foregoing.

In FIG. 12, when the value of the steering torque signal T becomes smaller than the minus reference torque value −$T_P$ (T<−$T_P$), the steering enters the rightward assist inhibition region as shown in FIG. 13, so that the drive-inhibition-condition determination section 25 of FIG. 4 is activated to supply the low-level drive inhibition signal $S_{K1}$ and high-level drive inhibition signal $S_{K2}$ to the output inhibition section 26 and zero-value generator section 27.

Then, the zero-value generator section 27 sends the coefficient $K_S$ of value 0 to the multiplier 28, which in turn supplies a modified target motor current signal $I_O$ of value 0. By the low-level drive inhibition signal $S_{K1}$ being thus sent to the output inhibition section 26, the first and fourth FETs Q1 and Q4 of FIG. 8 are turned off and the motor current $I_{M+}$, and hence the detected motor current signal $I_{MF}$ output from the motor current detector 15, becomes zero. Further, because the modified target motor current signal $I_O$ becomes zero in value due to the operation of the zero-value setting section 17 and the detected motor current signal $I_{MF}$ also becomes zero in value due to the operation of the drive inhibition section 18, the offset calculator section 22 outputs the offset signal ΔI (=$I_O$−$I_{MF}$) of value 0.

Further, the inhibition cancellation section 19 supplies the low-level cancellation signal $K_J$ to the drive-inhibition-condition determination section 25, on the basis of the zero-value coefficient $K_S$ given from the zero-value generator section 27 and zero-value offset signal ΔI given from the offset calculator section 22, so that the determination section 25 supplies the output inhibition section 26 with the drive inhibition signals $S_{K1}$ and $S_{K2}$ at high level to thereby cancel the output inhibition state.

Once the output inhibition section 26 inhibits the output of the motor control signal, the rightward steering assist to the steering system is removed and the electric motor 8 is deactivated. Thus, the minus (−) steering torque signal T becomes zero in value. In this way, at the time point when the drive inhibition state is canceled, the offset signal ΔI has become zero in value and the motor control signal $V_D$ from the drive control section 23 is also of zero value, so that no motor current $I_M$ flows through the motor 8 and no electric steering assist is given to the vehicle steering system.

The operation of the zero-value setting section 17, drive inhibition section 18 and inhibition cancellation section 19 has been described above assuming that the microprocessor anomaly disappears instantaneously. However, in the case where the microprocessor has completely broken down, the modified target motor current signal $I_O$ can not be set to the zero value and thus the abnormal condition would last in the microprocessor. Because no cancellation signal $K_J$ is output from the inhibition cancellation section 19 in this case, the motor drive inhibition by the inhibition section 18 would persist.

An additional arrangement may be added to the power steering apparatus such that the power supply from the battery is stopped by opening a relay contact between the battery and the motor driver circuit 14 the moment that duration of the abnormal condition counted by a timer (not shown) exceeds a predetermined time value.

As described above, the electric power steering apparatus 1 in accordance with the first embodiment of the present invention is characterized primarily in that the control unit 13 includes: the motor drive inhibition section 18 for inhibiting the output of the motor control signal $V_D$ on the basis of at least the steering torque signal T supplied from the steering torque sensor 12; the zero-value setting section 17 for, when the drive inhibition signals $S_{K1}$ and $S_{K2}$ are output from the motor drive inhibition section 18, setting the target motor current signal $I_{MS}$ to the zero value irrespective of the level or value of the steering torque signal T; and the inhibition cancellation section 19 for cancelling the drive inhibition signals $S_{K1}$ and $S_{K2}$ when the offset signal ΔI, indicative of the offset between the target motor current signal and the detected motor current, becomes zero in value after the target motor current $I_{MS}$ is set to the zero value by the zero-value setting section 17. With this inventive arrangement, instructions can be communicated bidirectionally from the motor drive inhibition section 18 to the main power steering control where an anomaly has occurred and from the main power steering control to the inhibition cancellation section 19. Thus, the inhibition of the motor drive can be canceled promptly, and it can also be guaranteed that no electric steering assist acts on the vehicle steering system at the time of the inhibition cancellation.

Further, in the inventive electric power steering apparatus 1, the transmission of the drive inhibition signals from the motor drive inhibition section 18 constituting the subsidiary power steering control to the microprocessor constituting the main power steering control and the transmission of the zero-value coefficient and offset signal from the microprocessor to the inhibition cancellation section 19 constituting the subsidiary power steering control are executed in an intercommunication manner. Such intercommunication allows the motor drive inhibition and cancellation of the inhibition to be effected with reliability.

Figure 9:
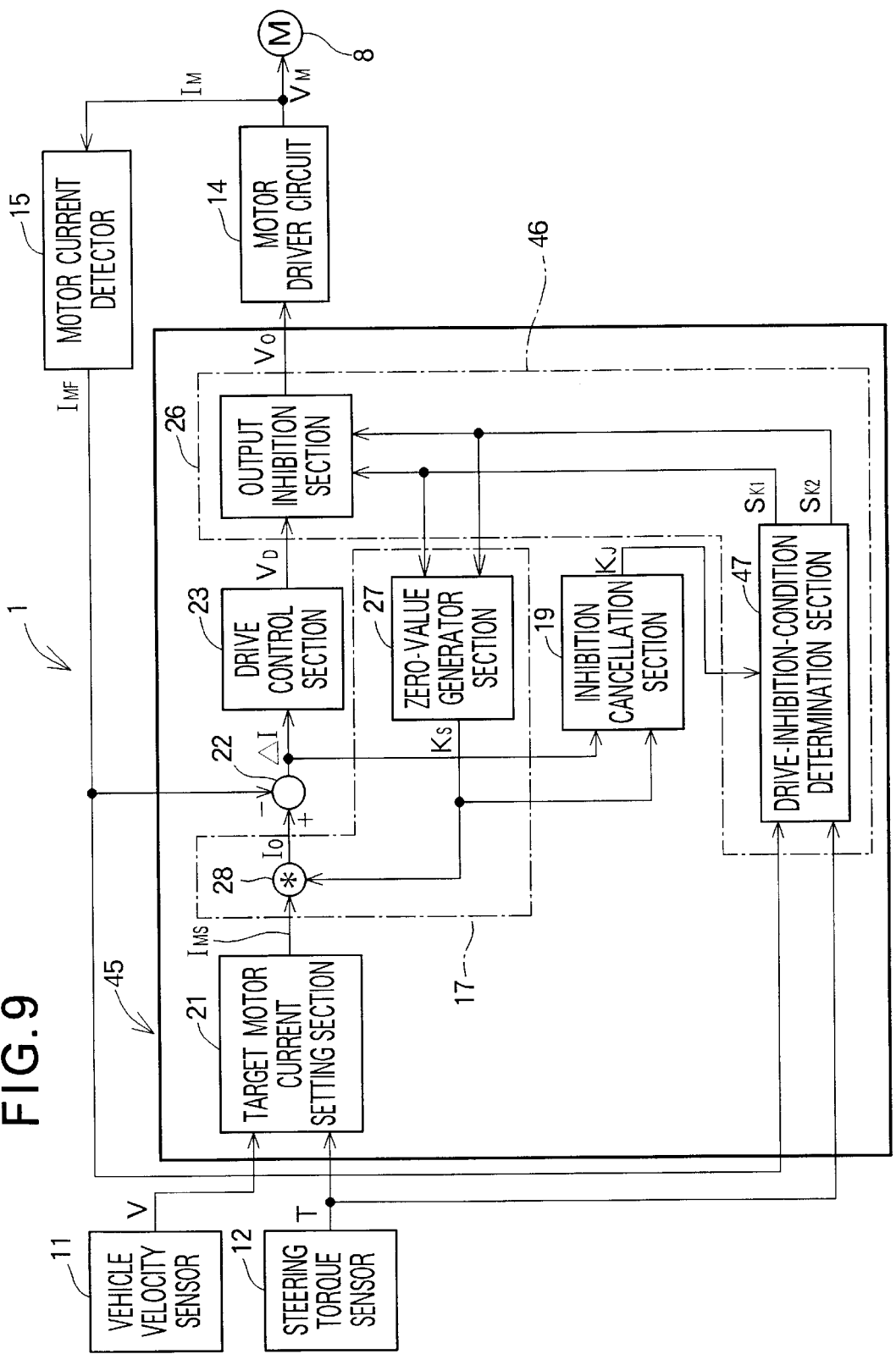
FIG. 9 is a block diagram showing a general organization of an electric power steering apparatus for an automotive vehicle according to a second embodiment of the present invention.

FIG. 9 is a block diagram showing a general organization of an electric power steering apparatus for an automotive vehicle according to a second embodiment of the present invention. Control unit 45 in the second embodiment includes a target motor current setting section 21, an offset calculator section 22, a drive control section 23, a zero-value setting section 17, a motor drive inhibition section 46 and an inhibition cancellation section 19; the control unit 45 in the second embodiment is generally similar to the control unit 13 in the first embodiment of FIG. 2 but differ therefrom only with respect to the motor drive inhibition section 46. Therefore, the following paragraphs only describe in detail the motor drive inhibition section 46, to avoid unnecessary duplication.

The motor drive inhibition section 46 in the second embodiment includes a drive-inhibition-condition determination section 47 and an output inhibition section 26. The drive-inhibition-condition determination section 47 includes a memory, such as a ROM, a comparator section and a logic operator section. The drive-inhibition-condition determination section 47 makes comparisons between a steering torque signal T output from the torque sensor 12 and prestored reference torque values $T_A$ and $-T_B$ and between a detected motor current signal $I_{MF}$ output from the motor current detector 15 and prestored reference current values $I_1$ and $I_2$ to thereby determine that the steering apparatus is in the rightward assist inhibition region, and then the determination section 47 supplies the output inhibition section 26 with a low-level drive inhibition signal $S_{K1}$ and a high-level drive inhibition signal $S_{K2}$.

Further, the drive-inhibition-condition determination section 47 makes comparisons between the steering torque signal T output from the torque sensor 12 and prestored reference torque values $-T_A$ and $T_B$ and between the detected motor current signal $I_{MF}$ output from the motor current detector 15 and prestored reference current values $-I_1$ and $-I_2$ to thereby determine that the steering apparatus is in the leftward assist inhibition region, and then the determination section 47 supplies the output inhibition section 26 with a high-level drive inhibition signal $S_{K1}$ and a low-level drive inhibition signal $S_{K2}$.

Figure 10:
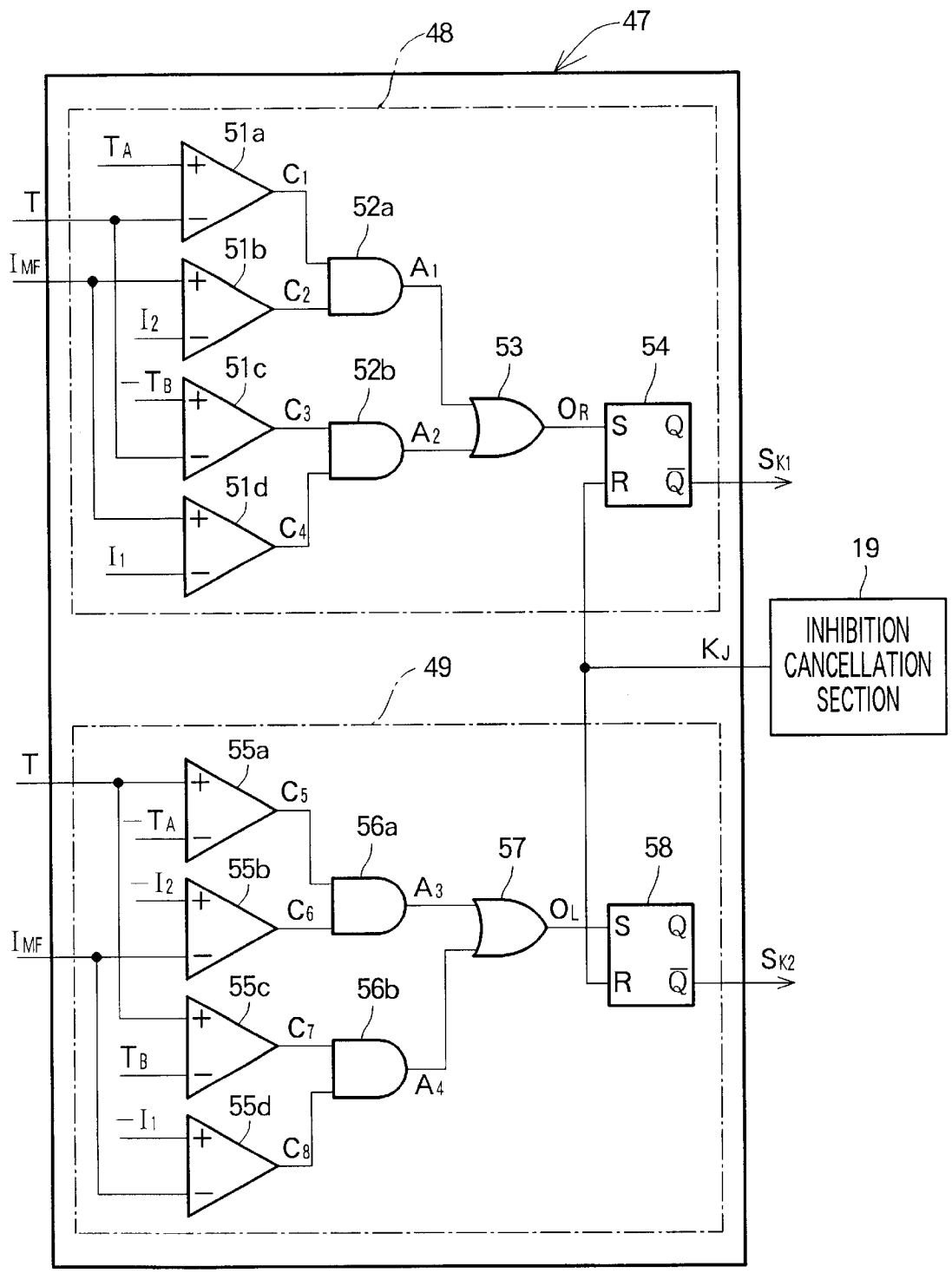
FIG. 10 is a block diagram showing in detail an exemplary construction of a drive-inhibition-condition determination section shown in FIG. 9.

FIG. 10 is a diagram showing an exemplary circuit structure of the drive-inhibition-condition determination section 47 employed in the second embodiment. As shown, the drive-inhibition-condition determination section 47 includes a rightward-assist-inhibition detector section 48 for determining that the steering apparatus is in the rightward assist inhibition region, and a leftward-assist-inhibition detector section 49 for determining that the steering apparatus is in the leftward assist inhibition region.

The rightward-assist-inhibition detector section 48 includes four comparators 51a–51d, two AND operators 52a and 52b, an OR operator 53, and a flip-flop 54. The comparator 51a comprises an operational amplifier, and the reference torque value $T_A$ is fed to a plus (+) input of the comparator 51a while the steering torque signal T is fed to a minus (−) input of the comparator 51a. When the value of the steering torque signal T is equal to or greater than the reference torque value $T_A$ ($T \geq T_A$), the comparator 51a gives a low-level comparison signal $C_1$ to the AND operator 52a. When the value of the steering torque signal T is smaller than the reference torque value $T_A$ ($T < T_A$), the comparator 51a gives a high-level comparison signal $C_1$ to the AND operator 52a.

The comparator 51b comprises an operational amplifier, and the detected motor current signal $I_{MF}$ is fed to a plus (+) input of the comparator 51b while the reference current value $I_2$ is fed to a minus (−) input of the comparator 51b. When the value of the detected motor current signal $I_{MF}$ is equal to or smaller than the reference current value $I_2$ ($I_{MF} \leq I_2$), the comparator 51b gives a low-level comparison signal $C_2$ to the AND operator 52a. When the value of the detected motor current signal $I_{MF}$ is greater than the reference current value $I_2$ ($I_{MF}>I_2$), the comparator 51b gives a high-level comparison signal $C_2$ to the AND operator 52a.

The comparator 51c comprises an operational amplifier, and the reference torque value $-T_B$ is fed to a plus (+) input of the comparator 51c while the steering torque signal T is fed to a minus (−) input of the comparator 51c. When the value of the steering torque signal T is equal to or greater than the reference torque value $-T_B$ ($T\geq-T_B$), the comparator 51c gives a low-level comparison signal $C_3$ to the AND operator 52b. When the value of the steering torque signal T is smaller than the reference torque value $-T_B$ ($T<-T_B$), the comparator 51c gives a high-level comparison signal $C_3$ to the AND operator 52b.

Further, the comparator 51d comprises an operational amplifier, and the detected motor current signal $I_{MF}$ is fed to a plus (+) input of the comparator 51d while the reference current value $I_1$ is fed to a minus (−) input of the comparator 51d. When the value of the detected motor current signal $I_{MF}$ is equal to or smaller than the reference current value $I_1$ ($I_{MF}\leq I_1$), the comparator 51d gives a low-level comparison signal $C_4$ to the AND operator 52b. When the value of the detected motor current signal $I_{MF}$ is greater than the reference current value $I_1$ ($I_{MF}>I_1$), the comparator 51d gives a high-level comparison signal $C_4$ to the AND operator 52b.

Note that in the described embodiment, the absolute value of the reference torque value $-T_B$ ($|T_B|$) is set to be greater than that of the reference torque value $T_A$ ($|T_A|$)(i.e., $|T_B|>|T_A|$) and the reference current value $I_2$ is set to be greater than the reference current value $I_1$ ($I_2>I_1$). These reference torque values $T_A$ and $-T_B$ and reference current values $I_1$ and $I_2$ are prestored in a ROM.

The AND operator 52a ANDs the comparison signals $C_1$ and $C_2$ and supplies a resultant AND signal $A_1$ to the OR operator 53. More specifically, when the comparison signals $C_1$ and $C_2$ are both at high level, the AND operator 52a outputs a high-level AND signal $A_1$. When either or each of the comparison signals $C_1$ and $C_2$ is at low level, however, the AND operator 52a outputs a low-level AND signal $A_1$.

The AND operator 52b ANDs the comparison signals $C_3$ and $C_4$ and supplies a resultant AND signal $A_2$ to the OR operator 53. More specifically, when the comparison signals $C_3$ and $C_4$ are both at high level, the AND operator 52a outputs a high-level AND signal $A_2$. When either or each of the comparison signals $C_3$ and $C_4$ is at low level, however, the AND operator 52b outputs a low-level AND signal $A_2$.

The OR operator 53 ORs the AND signal $A_1$ and the AND signal $A_2$ and supplies a resultant OR signal $O_R$ to a set input terminal (S) of the flip-flop 54. More specifically, when either or each of the AND signals $A_1$ and $A_2$ is at high level, the OR operator 53 outputs a high-level OR signal $O_R$. When the AND signals $A_1$ and $A_2$ are both at high level, however, the OR operator 53 outputs a low-level OR signal $O_R$.

The flip-flop 54 comprises, for example, a reset (R)-set (S) flip-flop, which, when a high-level signal is given to the set (S) input terminal, sets its "$\overline{Q}$" output to high level and its " " output to low level. When a high-level signal is given to the reset (R) input terminal, the flip-flop 54 sets its "$\overline{Q}$" output to low level and its "$\overline{Q}$" output to high level.

When the high-level OR signal $O_R$ is applied to the set input terminal, the flip-flop 54 outputs a low-level drive inhibition signal $S_{K1}$ via the "$\overline{Q}$" output to inhibit the rightward steering assist. Because the rightward steering assist is thus inhibited when the low-level drive inhibition signal $S_{K1}$ is output from the flip-flop 54, the above-mentioned rightward assist inhibition region represents a combination of an area where the value of the steering torque signal T is smaller than the reference torque value $T_A$ ($T<T_A$) and the value of the detected motor current signal $I_{MF}$ is greater than the reference current value $I_2$ ($I_{MF}>I_2$) and an area where the value of the steering torque signal T is smaller than the reference torque value $-T_B$ ($T<-T_B$) and the value of the detected motor current signal $I_{MF}$ is greater than the reference current value $I_1$ ($I_{MF}>I_1$).

The leftward-assist-inhibition detector section 49 of FIG. 10 is similar in construction and operation to the above-described rightward-assist-inhibition detector section 48. Namely, the leftward-assist-inhibition detector section 49 includes four comparators 55a–55d, two AND operators 56a and 56b, an OR operator 57, and a flip-flop 58. The leftward assist inhibition region as shown in FIG. 14 is symmetrical with the above-described rightward assist inhibition region about a coordinates origin point and thus description of the leftward assist inhibition region is omitted.

In the same manner as described earlier for the first embodiment in relation to FIG. 5, the motor drive inhibition is canceled by applying a high-level cancellation signal $K_J$ to the respective reset (R) input terminals of the flip-flops 54 and 58 to set the "$\overline{Q}$" outputs to high level and thereby setting the drive inhibition signals $S_{K1}$ and $S_{K2}$ to high level.

Figure 14:
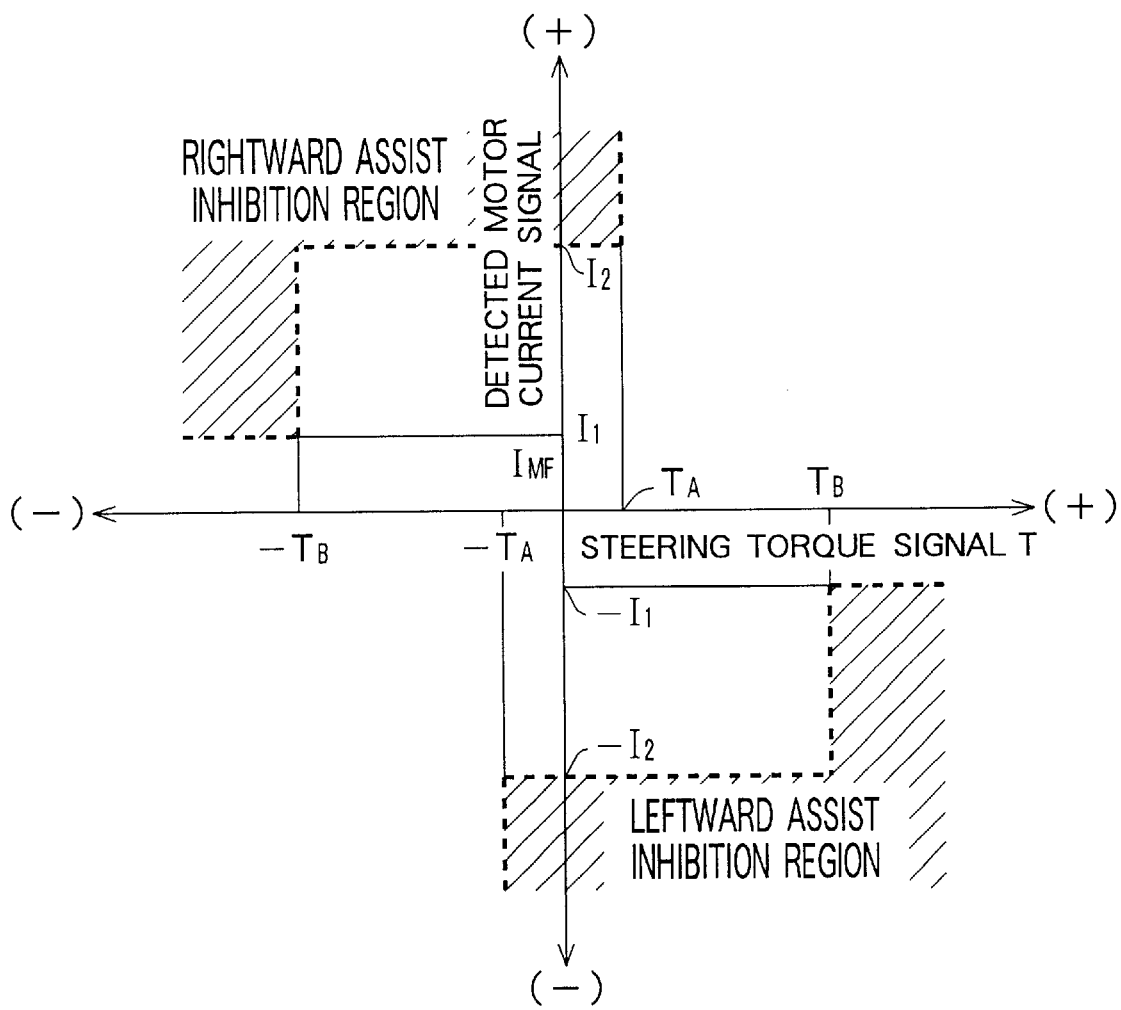
FIG. 14 is a diagram illustrating regions where output of the detected motor current signal is inhibited by the drive-inhibition-condition determination section of FIG. 10 depending on the value of the steering torque signal.

FIG. 14 is a diagram illustrating regions where output of the detected motor current signal $I_{MF}$ is inhibited by the drive-inhibition-condition determination section 47 of FIG. 10 depending on the value of the steering torque signal T. In FIG. 14, the rightward assist inhibition region (hatched portion) corresponds to the region described above in relation to the rightward-assist-inhibition detector section 48 of FIG. 10.

In the illustrated example of FIG. 14, the rightward assist inhibition region is extended to an area where the steering torque signal T is between the zero value and the reference torque value $T_A$ and the detected motor current signal $I_{MF}$ is greater than the reference current value $I_2$. The reason for providing such an extension of the rightward assist inhibition region is to prevent an anomaly in the microprocessor from causing an excessive motor current signal $I_{MF}$ ($I_{M+}$) in the neighborhood of the zero value of the steering torque signal T and thereby minimize the spontaneous rotation of the steering wheel that would be caused by the rightward steering assist of the motor acting on the vehicle steering system.

Because a plurality of value ranges are set for both the detected motor current signal $I_{MF}$ and steering torque signal T in the example of FIG. 14, it is possible to minimize the value of the motor current $I_M$ (detected motor current signal $I_{MF}$) during presence of the microprocessor anomaly. Therefore, the maximum value of the detected motor current signal $I_{MF}$ shown in FIG. 14 is limited by the reference current values $I_1$ or $I_2$, and therefore it is also possible to minimize the steering torque signal T to cease the spontaneous rotation of the steering wheel.

As described above, the electric power steering apparatus 1 in accordance with the second embodiment of the present invention is characterized in that the control unit 45 includes: the motor drive inhibition section 46 for inhibiting the output of the motor control signal $V_D$ on the basis of at least the steering torque signal T supplied from the steering torque sensor 12; the zero-value setting section 17 for, when the drive inhibition signals $S_{K1}$ and $S_{K2}$ are output from the motor drive inhibition section 46, setting the target motor current $I_{MS}$ to the zero value irrespective of the value of the steering torque signal T; and the inhibition cancellation section 19 for cancelling the drive inhibition signals $S_{K1}$ and $S_{K2}$ when the offset signal ΔI, indicative of the offset between the target motor current signal and the detected motor current, becomes zero in value after the target motor current $I_{MS}$ is set to the zero value by the zero-value setting section 17. With this inventive arrangement, instructions can be communicated bidirectionally from the motor drive inhibition section 46 to the main power steering control where an anomaly has occurred and from the main power steering control to the inhibition cancellation section 19. Thus, the inhibition of the motor drive can be canceled promptly, and it is possible to minimize deterioration of steering characteristics due to the microprocessor anomaly.

Particularly, with the arrangement that the target motor current signal is set to the zero value at the time of cancellation of the motor drive inhibition state, the electric power steering apparatus of the present invention can recover from the microprocessor anomaly with no steering assist imparted.

Further, because the assist inhibition regions can be set finely, the electric power steering apparatus of the present invention can appropriately deal with various anomalies in the microprocessor.

What is claimed is:

1. An electric power steering apparatus for a vehicle comprising:
    an electric motor for imparting an electric steering assist to a steering system of the vehicle;
    a steering torque sensor for detecting steering torque manually applied to the vehicle steering system to output a steering torque signal;
    a motor current detector for detecting a motor current actually flowing through said electric motor to output a detected motor current signal;
    a control unit including a target motor current setting section for setting a target motor current signal on the basis of at least the steering torque signal output by said steering torque sensor, an offset calculator section for calculating an offset between the target motor current signal set by said target motor current setting section and the detected motor current signal output by said motor current detector to thereby output an offset signal indicative of the offset calculated thereby, a drive control section for generating a motor control signal on the basis of the offset signal output by said offset calculator section, and a motor drive inhibition section for, on the basis of at least the steering torque signal output by said steering torque sensor, outputting drive inhibition signals to inhibit output of the motor control signal by said drive control section; and
    a motor driver circuit for driving said electric motor in accordance with the motor control signal output by said drive control section,
    wherein said control unit further includes: a zero-value setting section for, when the drive inhibition signals are output by said motor drive inhibition section, setting the target motor current signal to a zero value irrespective of a value of the steering torque signal; and
    an inhibition cancellation section for cancelling the drive inhibition signals when the offset signal output by said offset calculator section becomes zero after the target motor current signal is set to the zero value by said zero-value setting section.

2. An electric power steering apparatus as recited in claim 1 wherein said zero-value setting section includes:
    a zero-value generator section for, on the basis of the drive inhibition signals output by said motor drive inhibition section, detecting a motor drive inhibition condition where driving of said electric motor is to be inhibited and outputting a prestored coefficient signal of value 0 upon detection of the motor drive inhibition condition; and
    a multiplier for, when the motor drive inhibition condition is detected by said zero-value generator section, multiplies the target motor current signal by the coefficient of value 0 to thereby compulsorily set the target motor current signal to the zero value.

3. An electric power steering apparatus as recited in claim 2 wherein said zero-value generator section includes:
    a first storage section prestoring a value 1 as a coefficient;
    a second storage section prestoring a value 0 as a coefficient;
    a logic operator section for performing an exclusive OR operation on the drive inhibition signals output by said motor drive inhibition section, to detect whether or not said motor drive inhibition section is signaling the motor drive inhibition condition; and
    a selector section for selecting between the coefficient of the value 1 stored in said first storage section and the coefficient of the value 0 stored in said second storage section, to supply the coefficient of the value 1 or the coefficient of the value 0 to said multiplier for multiplication with the target motor current signal.

4. An electric power steering apparatus as recited in claim 1 wherein said inhibition cancellation section includes:
    a first inverter for inverting the coefficient signal of value 0 output by said zero-value setting section;
    a second inverter for inverting the offset signal of value 0 output by said offset calculator section; and
    an AND circuit for performing an AND operation on the coefficient signal inverted by said first inverter and the offset signal inverted by said second inverter,
    wherein an output from said AND circuit is supplied to said motor drive inhibition section as an inhibition cancellation signal, so as to cancel inhibition of the driving of said electric motor.

5. An electric power steering apparatus as recited in claim 1 wherein said motor drive inhibition section includes:
    a drive-inhibition-condition determination section for making a comparison between the steering torque signal output by said steering torque sensor and prestored reference torque values and outputs the drive inhibition signals when a result of the comparison indicates that the driving of said electric motor is to be inhibited; and
    an output inhibition section for, when said drive-inhibition-condition determination section determines that the driving of said electric motor is to be inhibited, inhibiting output of the motor control signal from said motor drive section in accordance with the drive inhibition signals.

6. An electric power steering apparatus as recited in claim 1 wherein said motor drive inhibition section inhibits output of the motor control signal on the basis of at least the steering torque signal and the detected motor current signal.

* * * * *